Aug. 8, 1967　　　E. J. WALSH　　　3,334,959
ADJUSTABLE OPTICAL DEVICE
Filed Oct. 17, 1963
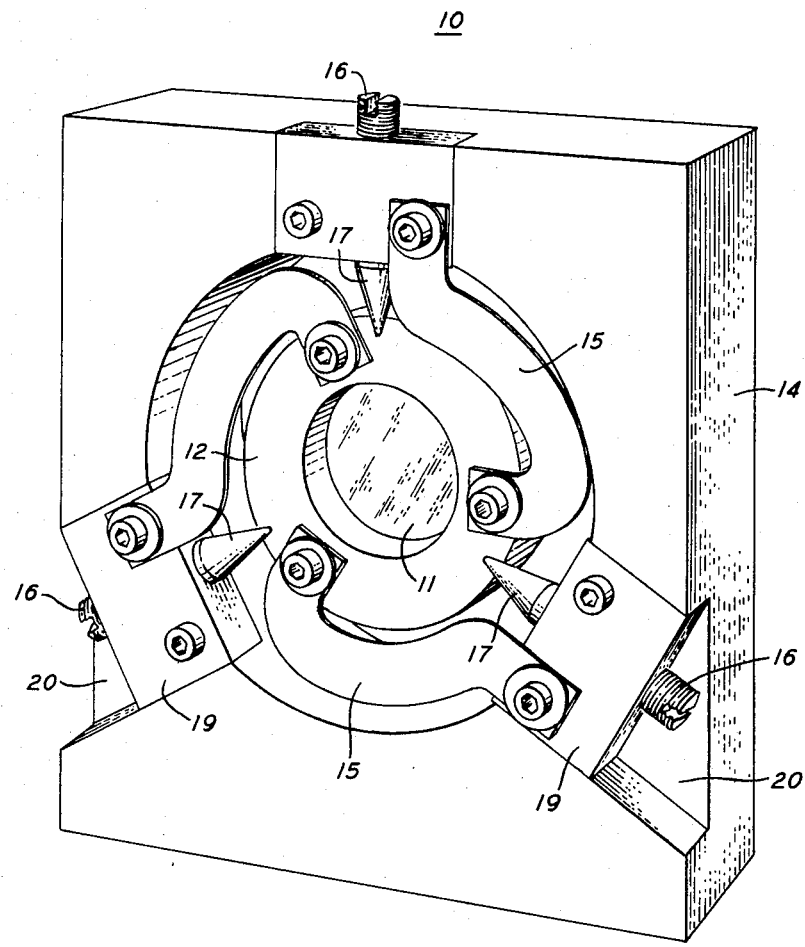
INVENTOR
E. J. WALSH
BY
Roderick B. Anderson
ATTORNEY 3,334,959
ADJUSTABLE OPTICAL DEVICE
Edward J. Walsh, Morris Plains, N.J., assignor to Bell Telephone Laboratories, Incorporated, New York, N.Y., a corporation of New York
Filed Oct. 17, 1963, Ser. No. 316,921
4 Claims. (Cl. 350—310)

This invention relates to optical devices, and more particularly, to adjustable mirrors for use in conjunction with optical masers.

The optical maser, or laser, is a relatively recent invention of far-reaching technological importance because of its ability to amplify light waves and to generate coherent light frequency oscillations. This is possible because certain active mediums, such as ruby or a gaseous mixture of helium and neon, are capable of population inversion. Population inversion refers to the excitation of an abnormally high proportion of atoms to a predetermined high energy state. As the atoms decay to more stable lower energy levels, optical radiation at a predetermined frequency is stimulated through a sort of cascading chain-reaction phenomenon of photons among the atoms. Such stimulated emission of radiation may be used for generating coherent light or for amplifying light waves of a frequency corresponding to the radiation frequency.

It is customary to use mirrors on opposite sides of the optical maser structure to form an optical resonator for reflecting the light energy back and forth through the active medium to increase its power. Normally, one of the mirrors is only partially reflecting so that part of the light energy can pass through it and be derived as a useful output. If the device is used as an amplifier both of the mirrors may be partially reflecting with one of them being used to admit incoming light in addition to forming the optical cavity. Regardless of the combination of totally reflecting or partially reflecting mirrors that are used in an optical maser amplifier or oscillator, it is generally important that the surfaces of the mirrors be precisely perpendicular to the optical paths so that no deviation from its path is made when the light beam is reflected.

It is an object of this invention to provide a mirror device, the angular position of which can be accurately and easily controlled.

It is another object of this invention to simplify the structure of an accurately adjustable mirror device, and to reduce the fabrication problems involved in building such a device.

These and other objects of the invention are attained in an illustrative embodiment thereof comprising a circular mirror which is firmly mounted within the central aperture of an annular mirror holder. The mirror holder, in turn, is secured within an aperture of a frame by three leaf springs. The leaf springs are roughly S-shaped and they bias the mirror holder in the direction of the central axis of the frame aperture. Three adjusting screws in the frame have cone-shaped ends which bear against the mirror holder in opposition to the spring bias. The screws are located at approximately 120° intervals around the frame aperture so that when any of the screws is adjusted the wedge action of its conical end on the mirror holder tilts the holder on an axis defined by the other two screws. With this arrangement, the holder can be tilted on any of three axes to give a fine adjustment of the inclination of the mirror. Part of the simplicity of the device derives from the fact that the leaf springs act both to support the holder and to mechanically bias it along its central axis. Another feature is the elimination of pivots which could wear out or interfere with the light wave transmission.

These and other objects and features of the invention will be more clearly understood from the consideration of the following detailed description taken in conjunction with the accompanying drawing, which is a perspective view of an illustrative embodiment of the invention.

Referring now to the drawing, there is shown an adjustable mirror device 10 for reflecting at least part of the light energy from an optical maser back into the active medium of the optical maser. The device comprises a mirror 11 mounted within an annular mirror holder 12. The mirror holder, in turn, is mounted within the central aperture of a frame 14 by three roughly S-shaped leaf springs 15 spaced uniformly around the central aperture. In addition to supporting the mirror holder, the springs 15 bias the holder along the central axis of the frame aperture. Also mounted at approximately 120° intervals around the frame aperture are three adjusting screws 16 having cone-shaped ends 17 which bear against the mirror holder in opposition to the mechanical bias of the leaf springs. When any of the adjusting screws are screwed either in or out, the wedge action of its tapered end on the mirror holder rotates the mirror holder on an axis defined by the ends 17 of the other two adjusting screws. By successively adjusting each of the three screws, the mirror holder is rotated slightly upon each of the three axes so that a mirror 11 can be located precisely perpendicularly to a beam of light traveling along the central axis or to any other desired inclination to the beam of light.

Three metal blocks 19 are mounted on the frame 14, evenly spaced therearound and each supporting one of the adjusting screws and one of the leaf springs. Each of the block, adjusting screw, and leaf spring subassemblies are identical so that they can be mass produced and thereafter conveniently fitted to the frame 14. The frame may be made of aluminum with pre-cut radial notches 20 to receive the blocks 19 which may be of stainless steel. Stainless steel blocks are preferred because threads can be accurately machined in them to high tolerances which will withstand considerable use with little wear. The other end of each leaf spring is advantageously attached to the mirror holder near its point of contact with one of the adjusting screws so as to mechanically bias the holder directly against each of the adjusting screws. The springs and the screws are preferably made of steel. Of course, numerous other material for all of the elements could alternatively be used.

It can be shown that when any of the adjusting screws are rotated to tilt the mirror holder, the mirror holder rotates on its central axis, in addition to being tilted. The S-shaped springs inherently accommodate this rotation and permit the mirror holder to move along its central axis when it is adjusted. On the other hand, if straight leaf springs were used to directly connect the mirror holder with the frame, movement of the mirror holder would be seriously limited by the length of the springs. Since the leaf springs support the mirror holder, they could not be made of a material so ductile or flexible as to permit their net length to be increased by stretching during every adjustment. With S-shaped springs, no stretching is required for accommodating movement of the mirror holder.

It can be appreciated that numerous modifications of the invention could be made if so desired. For example, the adjusting screws could be replaced by rotatable pins with conventional cam-shaped ends. A different number of adjusting screws could be used, although the use of three screws offers many advantages that cannot be attained by any other number. For example, the use of three screws establishes three well-defined axes of rotation between each pair of adjacent screws; if a different number of screws were used other complications would probably be necessary to insure that the mirror holder was firmly braced around its entire periphery. Also, an optical maser has recently been proposed which uses mirrors to successively reflect the light beam at an angle to establish a zig-zag beam path. The present mirror device could be used here to reflect the light at the proper angle. Further, since there is no obstruction along the central axis of the device, it can be seen that the present device could also be used for supporting a lens or other type of optical structure. Numerous other modifications can be made by those skilled in the art without departing from the spirit and scope of the invention.

What is claimed is:
1. An adjustable reflecting device comprising:
   a frame having a central aperture which defines a central axis;
   a mirror attached to a mirror holder;
   means for supporting the mirror holder within the aperture substantially transversely to the central axis and for mechanically biasing the mirror holder in the direction of the central axis comprising a plurality of flat leaf springs located substantially in a plane transverse to the central axis and attached to the frame and to the mirror holder;
   and means for inclining the mirror holder with respect to the central axis comprising at least three adjusting screws mounted to the frame and having end portions which extend into the aperture;
   said end portions being cone shaped and bearing against the mirror holder in opposition to the mechanical bias of the leaf springs;
   the screws being located at substantially equal intervals around the periphery of the aperture;
   one adjusting screw being located between each of the adjacent leaf springs around the periphery of the aperture.
2. The adjustable reflecting device of claim 1 wherein:
   only three adjusting screws are mounted to the frame, the screws being located at approximately 120° intervals around the periphery of the aperture, whereby the mirror holder may be tilted on any of three axes.
3. An adjustable mirror which is at least partially reflecting for use in an optical maser comprising:
   a frame having a central aperture which defines a central axis;
   a reflector firmly attached to a reflector holder;
   means for supporting the reflector holder within the aperture substantially transverse to the central axis and for mechanically biasing the holder in the direction of the central axis;
   said support and bias means comprising three S-shaped leaf springs each located substantially in a plane transverse to the central axis and attached at one end to the frame and at the other end to the holder;
   means for inclining the reflector holder with respect to the central axis comprising three adjusting screws mounted in the frame and having end portions which extend into the aperture;
   said end portions being located at substantially 120° intervals arond the periphery of the aperture and having cone-shaped surfaces that bear against the holder in opposition to the bias of the leaf springs.
4. An adjustable mirror which is at least partially reflecting for use in an optical maser comprising:
   a frame structure having a central aperture that defines a central axis and three radial notches located at approximately 120° intervals;
   a reflector firmly attached to a reflector holder which is mounted within the aperture;
   three identical subassemblies each mounted within one of the notches;
   each of the subassemblies comprising a metal block which is attached to said frame, a threaded adjusting screw which extends through the block, and a leaf spring one end of which is attached to one side of the block;
   the other end of each of the leaf springs being attached to the reflector holder;
   each leaf spring located substantially in a plane transverse to the axis of the central aperture;
   each of the adjusting screws having cone-shaped ends which extend into the aperture and bear against the reflector holder;
   the leaf springs comprising means for mechanically biasing the mirror holder against the cone-shaped ends of the adjusting screws.

References Cited

UNITED STATES PATENTS 3,204,471   9/1965   Rempel.

FOREIGN PATENTS 517,429   2/1955   Italy.

OTHER REFERENCES

Killpatrick et al.: "Alignment Characteristics of a Helium-Neon Optical Maser," Proceedings of the IRE, vol. 50, No. 6, June 1962, p. 1521.

JEWELL H. PEDERSEN, *Primary Examiner*

O. B. CHEW, *Assistant Examiner.*